(12) United States Patent
Miyazaki

(10) Patent No.: US 9,081,467 B2
(45) Date of Patent: Jul. 14, 2015

(54) DISPLAY APPARATUS AND NON-TRANSITORY STORAGE MEDIUM STORING PROGRAM

(75) Inventor: Sadaaki Miyazaki, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 203 days.

(21) Appl. No.: 13/616,045

(22) Filed: Sep. 14, 2012

(65) Prior Publication Data
US 2013/0162662 A1    Jun. 27, 2013

(30) Foreign Application Priority Data

Dec. 26, 2011   (JP) ................. 2011-282980

(51) Int. Cl.
*G06F 3/048*    (2013.01)
*G06T 1/00*    (2006.01)
*G06F 3/0481*    (2013.01)
*H04N 1/00*    (2006.01)
*G06F 3/0482*    (2013.01)
*G06F 3/0485*    (2013.01)

(52) U.S. Cl.
CPC ............. *G06F 3/048* (2013.01); *G06F 3/0482* (2013.01); *G06F 3/0485* (2013.01); *G06T 1/00* (2013.01); *H04N 1/00411* (2013.01); *H04N 1/00435* (2013.01); *H04N 1/00517* (2013.01)

(58) Field of Classification Search
CPC ....................................... G06F 3/048
USPC ........................ 345/522, 532, 533, 537, 538
See application file for complete search history.

(56) References Cited

U.S. PATENT DOCUMENTS

| | | | | |
|---|---|---|---|---|
| 7,091,998 | B2 * | 8/2006 | Miller-Smith | 715/810 |
| 8,054,515 | B2 * | 11/2011 | Yamakado et al. | 358/474 |
| 8,564,708 | B2 * | 10/2013 | Suehiro et al. | 348/333.01 |
| 2008/0292212 | A1 * | 11/2008 | Ozaki | 382/284 |
| 2011/0069074 | A1 * | 3/2011 | Kuma et al. | 345/522 |
| 2011/0074798 | A1 * | 3/2011 | Nakayama | 345/522 |
| 2012/0026193 | A1 * | 2/2012 | Higeta | 345/637 |

FOREIGN PATENT DOCUMENTS

EP   0767418 A1 *  9/1997 ............. G06F 3/033
JP   H09-134269 A   5/1997

* cited by examiner

*Primary Examiner* — Devona Faulk
*Assistant Examiner* — Hai Tao Sun
(74) *Attorney, Agent, or Firm* — Scully, Scott, Murphy & Presser, PC

(57) ABSTRACT

A display apparatus, including: a display switching unit which, when at least one image is being displayed, cyclically switches the image to be displayed in an ascending order or a descending order; a command receiving unit which receives a predefined-image display command which causes a predefined image to be displayed; an image-number obtaining unit which, when the predefined-image display command is received, obtains the number of images within a range from the image being displayed to the predefined image for each of the ascending order and/or the descending order; and a switching-order determining unit which determines, as a switching order, the ascending order or the descending order with a fewer number of images being present in the range. When the predefined-image display command is received, the display switching unit displays the predefined image by switching the image to be displayed in the determined switching order.

21 Claims, 8 Drawing Sheets

SCREEN INFORMATION TABLE 11b

| SCREEN NUMBER (11b1) | SCREEN NAME (11b2) | PREDEFINED SCREEN FLAG (11b3) | SHORTCUT BUTTON (11b4) | | | | | |
|---|---|---|---|---|---|---|---|---|
| | | | BUTTON 1 (11b4a) | BUTTON 2 (11b4b) | BUTTON 3 (11b4c) | BUTTON 4 (11b4d) | BUTTON 5 (11b4e) | BUTTON 6 (11b4f) |
| 1 | HOME | 1 | | | | | | |
| 2 | ADVANCED PRINTING | 0 | | | | | | |
| 3 | SHORTCUT 1 | 0 | B&W | NORMAL | 0 | 0 | 0 | 0 |
| 4 | SHORTCUT 2 | 0 | 0 | 0 | 0 | 0 | 0 | 0 |
| 5 | SHORTCUT 3 | 0 | 0 | 0 | 0 | 0 | 0 | 0 |

FIG. 2

SCREEN INFORMATION TABLE 11b

| SCREEN NUMBER | SCREEN NAME | PREDEFINED SCREEN FLAG | SHORTCUT BUTTON ||||||
|---|---|---|---|---|---|---|---|---|
| | | | BUTTON 1 | BUTTON 2 | BUTTON 3 | BUTTON 4 | BUTTON 5 | BUTTON 6 |
| 1 | HOME | 1 | | | | | | |
| 2 | ADVANCED PRINTING | 0 | | | | | | |
| 3 | SHORTCUT 1 | 0 | B&W | NORMAL | o | o | o | o |
| 4 | SHORTCUT 2 | 0 | o | o | o | o | o | o |
| 5 | SHORTCUT 3 | 0 | o | o | o | o | o | o |

11b1 · 11b2 · 11b3 · 11b4 (11b4a, 11b4b, 11b4c, 11b4d, 11b4e, 11b4f)

DISPLAY APPARATUS AND NON-TRANSITORY STORAGE MEDIUM STORING PROGRAM

CROSS REFERENCE TO RELATED APPLICATION

The present application claims priority from Japanese Patent Application No. 2011-282980, which was filed on Dec. 26, 2011, the disclosure of which is herein incorporated by reference in its entirety.

BACKGROUND

1. Field of the Invention

The present invention relates to a display apparatus and a non-transitory storage medium storing a program for the display apparatus.

2. Description of the Related Art

There is known a display apparatus in which a screen displays a cylindrical or polyhedral rotational body with a plurality of icons arranged on its outer surface. The rotational body, when operated by a user, rotates in an up and down direction or a right and left direction to switch icons to be displayed.

SUMMARY

To rotate the rotational body in this display apparatus, however, the user needs to move a touch object (such as a finger) on the screen in a direction in which the user wants to rotate the rotational body. Thus, the more the number of icons arranged on the rotational body, the more operations the user has to perform before a desired icon is displayed, resulting in complicated operations.

In order to solve this problem, it is possible to consider a technique in which a predetermined key operation is designed to cause the rotation of the rotational body to switch a currently displayed icon to an icon that is defined as a reference in advance (hereinafter may be referred to as "reference icon"). The rotational direction of the rotational body, however, includes two directions opposite to each other, e.g., one direction and a direction reverse to the one direction. Thus, if the above-described technique is employed, a distance from the currently displayed icon to the reference icon may be long in some rotational direction, and accordingly a length of time from the predetermined key operation to the display of the reference icon is made longer unfortunately. It is noted that such a problem also arises in various displays other than the display of the icons. For example, such a problem arises in a display apparatus configured to display one of a plurality of screens each containing at least one icon by switching these screens in a predetermined display order.

This invention has been developed to provide a display apparatus and a non-transitory storage medium storing a program, capable of enhancing convenience to a user where a plurality of images such as icons and screens are displayed by being switched in a display order.

The present invention provides a display apparatus, comprising: a display; a storage configured to store order information representative of a display order of a plurality of images to be displayed on the display; a processor; and a memory configured to store instructions that are executed by the processor to cause the display apparatus to function as: an image display unit configured to display at least one image of the plurality of images on the display; a display switching unit configured, when the at least one image of the plurality of images is being displayed on the display by the image display unit, to switch the image to be displayed on the display in one of an ascending order and a descending order based on the order information stored in the storage, wherein the ascending order is an order from a first image toward a last image in the display order and is an order in which an image to be displayed following the last image in the display order is the first image in the display order, and wherein the descending order is an order from the last image toward the first image in the display order and is an order in which an image to be displayed following the first image in the display order is the last image in the display order; a command receiving unit configured, when the at least one image of the plurality of images is being displayed on the display by the image display unit, to receive a predefined-image display command which causes a predefined one of the plurality of images to be displayed on the display as a predefined image; an image-number obtaining unit configured, when the predefined-image display command is received by the command receiving unit, to obtain at least one of: the number of images present within a range from the image being displayed on the display to the predefined image in the ascending order; and the number of images present within a range from the image being displayed on the display to the predefined image in the descending order; and a switching-order determining unit configured, based on the at least one of the numbers of images obtained by the image-number obtaining unit, to determine one order of the ascending order and the descending order as a switching order of the images based on the predefined-image display command, a fewer number of images being present in the range in the one order than in the other order of the ascending order and the descending order, wherein the display switching unit is configured, when the predefined-image display command is received by the command receiving unit, to display the predefined image on the display by switching the image to be displayed on the display in the switching order determined by the switching-order determining unit.

The present invention also provides a non-transitory storage medium storing a program executed by a computer of a display apparatus comprising a display and a storage configured to store order information representative of a display order of a plurality of images to be displayed on the display, the program designed to have the computer function as: an image display unit configured to display at least one image of the plurality of images on the display; a display switching unit configured, when the at least one image of the plurality of images is being displayed on the display by the image display unit, to switch the image to be displayed on the display in one of an ascending order and a descending order based on the order information stored in the storage, wherein the ascending order is an order from a first image toward a last image in the display order and is an order in which an image to be displayed following the last image in the display order is the first image in the display order, and wherein the descending order is an order from the last image toward the first image in the display order and is an order in which an image to be displayed following the first image in the display order is the last image in the display order; a command receiving unit configured, when the at least one image of the plurality of images is being displayed on the display by the image display unit, to receive a predefined-image display command which causes a predefined one of the plurality of images to be displayed on the display as a predefined image; an image-number obtaining unit configured, when the predefined-image display command is received by the command receiving unit, to obtain at least one of: the number of images present within a range from the image being displayed on the display to the predefined image in the ascending order; and the number of images present within a range from the image being displayed on the display to the predefined image in the descending order; and a switching-order determining unit configured, based on the at least one of the numbers of images obtained by the image-number obtaining unit, to determine one order of the ascending order and the descending order as a switching order of the images based on the predefined-image display command, a fewer number of images being present in the range in the one order than in the other order of the ascending order and the descending order, wherein the display switching unit is configured, when the predefined-image display command is received by the command receiving unit, to display the predefined image on the display by switching the image to be displayed on the display in the switching order determined by the switching-order determining unit.

BRIEF DESCRIPTION OF THE DRAWINGS

The objects, features, advantages, and technical and industrial significance of the present invention will be better understood by reading the following detailed description of the embodiment of the invention, when considered in connection with the accompanying drawings, in which:

FIG. 2 is a view schematically showing a screen information table;

DETAILED DESCRIPTION OF TIE EMBODIMENT

Figure 1:
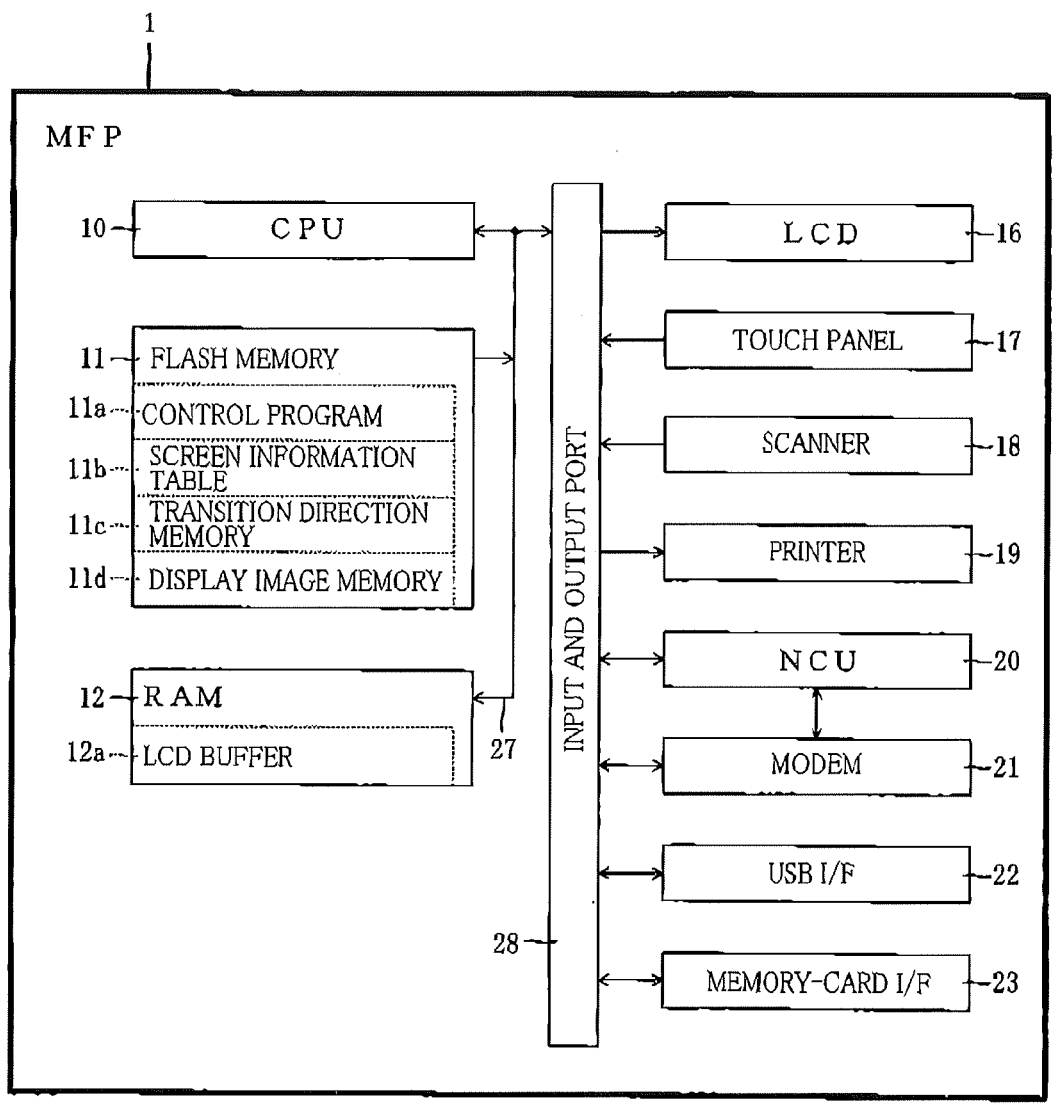
FIG. 1 is a block diagram showing an electric configuration of an MFP according to one embodiment of the present invention.

Hereinafter, there will be described one embodiment of the present invention by reference to the drawings. FIG. 1 is a block diagram showing an electric configuration of a multi-function peripheral (MFP) 1 as one example of a display apparatus. The MFP 1 has various functions such as a copying function, a facsimile function, a scanning function, a printing function, and a "media printing" function.

The MFP 1 according to the present embodiment is configured such that a screen being displayed (a currently displayed screen) can be switched to a predefined screen which is defined as a reference in advance, with a single operation in a state in which an LCD 16 displays a cyclically-arranged screen set 50 (see FIG. 3) constituted by a plurality of screens which are switchable cyclically in a predetermined display order. In particular, in a case where the screen is switched to the predefined screen with the single operation, the MFP 1 according to the present embodiment determines a switching order of the screens with the least number of screens to be switched in a process before the predefined screen is displayed, allowing a user to easily recognize the screens being switched. It is noted that the wording "switchable cyclically in a predetermined display order" means that, when screens are switched or scrolled in a direction directed from the first screen to the last screen of the display order, the last screen can be switched to the first screen as a next screen and that, when the screens are switched or scrolled in a direction directed from the last screen to the first screen of the display order, the first screen can be switched to the last screen as a next screen.

The MFP 1 includes a CPU 10, a flash memory 11, a RAM 12, the LCD 16, a touch panel 17, a scanner 18, a printer 19, an NCU 20, a modem 21, a USB interface (USB I/F) 22, and a memory-card interface (memory-card I/F) 23. The CPU 10, the flash memory 11, and the RAM 12 are connected to one another by a bus line 27. Also, the LCD 16, the touch panel 17, the scanner 18, the printer 19, the NCU 20, the modem 21, the USB I/F 22, the memory-card I/F 23, and the bus line 27 are connected to one another by an input and output port 28.

The CPU 10 controls the components connected to the input and output port 28 and the various functions of the MFP 1 according to fixed values and programs stored in the flash memory 11, data stored in the RAM 12, or various signals which are transmitted and received via the NCU 20.

Figure 6:
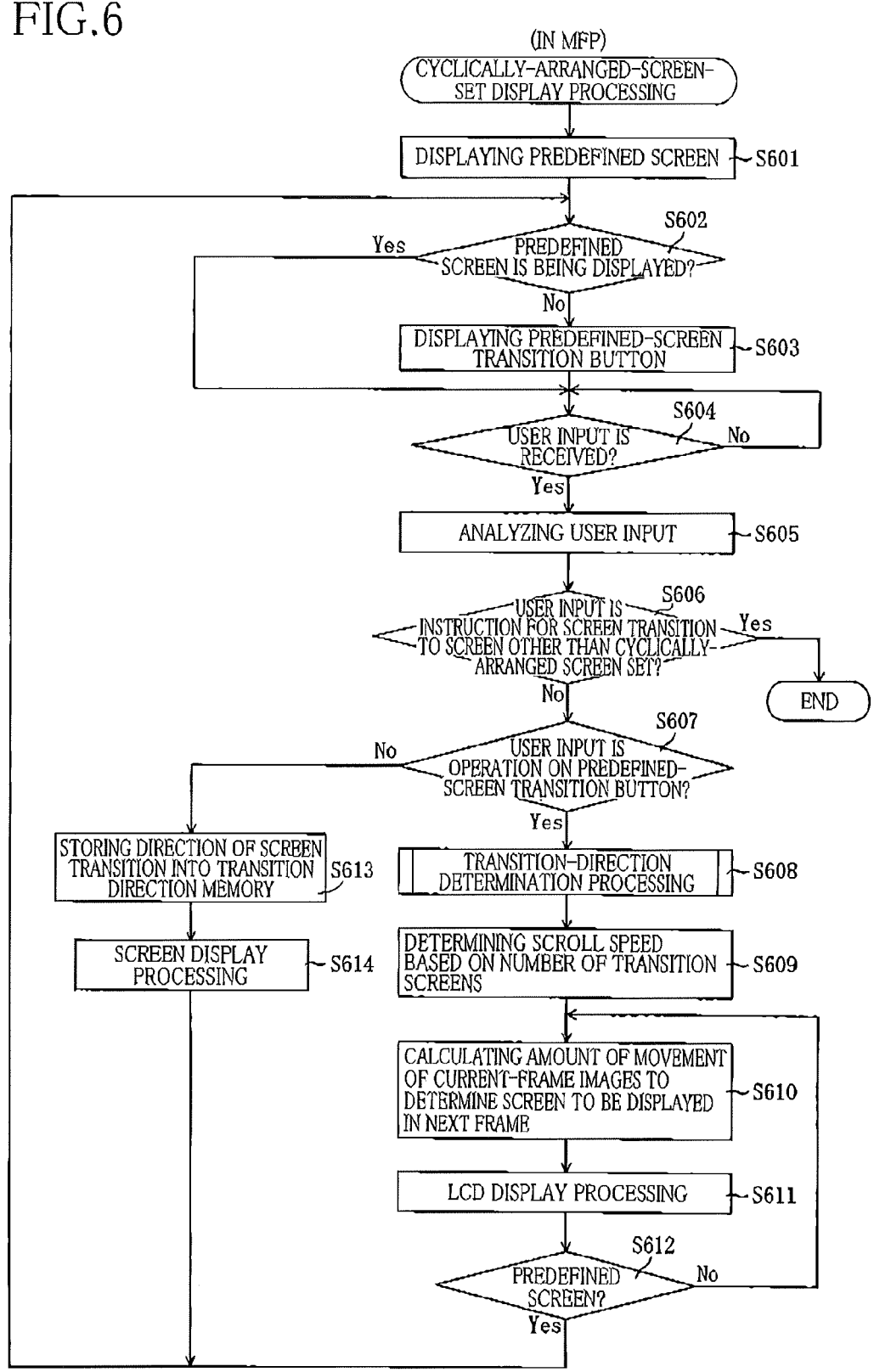
FIG. 6 is a flow chart showing a cyclically-arranged-screen-set display processing.
Figure 7:
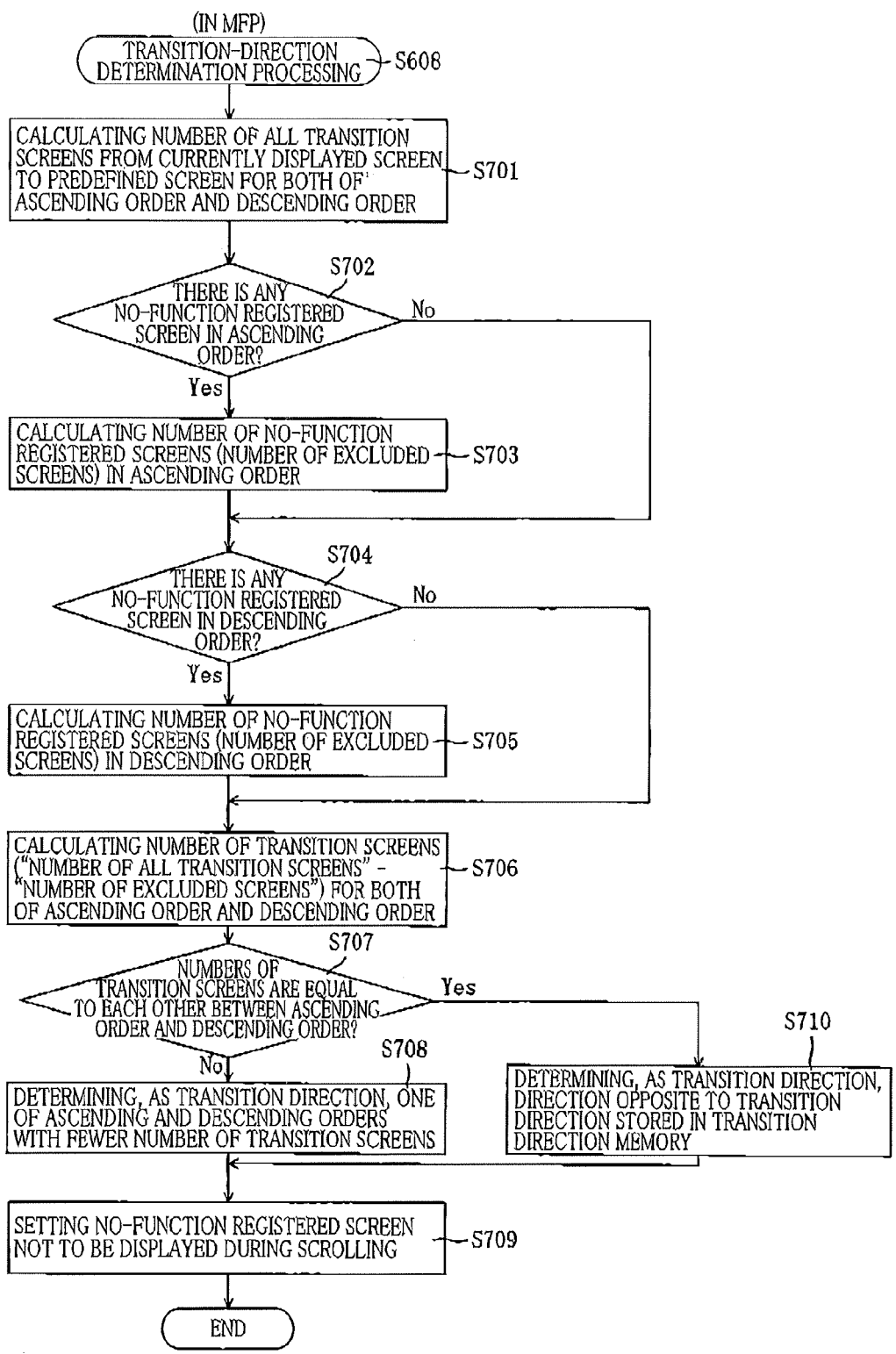
FIG. 7 is a flow chart showing a transition-direction determination processing.

The flash memory 11 is a non-transitory memory that stores, for example, a control program 11a for controlling operations of the MFP 1. It is noted that processings, which will be described below, shown in FIGS. 6 and 7 are executed by the CPU 10 according to the control program 11a.

The flash memory 11 includes a screen information table 11b, a transition direction memory 11c, and a display image memory 11d. The screen information table 11b is a table that stores a plurality of set values which are respectively assigned to five screens of the cyclically-arranged screen set 50 (see FIG. 3). The screen information table 11b will be explained later in detail with reference to FIG. 2. The transition direction memory 11c is an area for storing a direction of a screen transition when a transition of a display screen is made during the display of the cyclically-arranged screen set 50 by a flick operation or an operation on one of next-screen transition buttons 73, 74 (see FIG. 3). The display image memory 11d is an area that stores images (e.g., background images, parts images such as icons) required for the display of screens 50a-50e (see FIG. 3) of the cyclically-arranged screen set 50. To display the cyclically-arranged screen set 50 (the screens 50a-50e) on the LCD 16, the CPU 10 reads images required for the screen to be displayed, from the display image memory 11d and creates display data for the screen in an LCD buffer 12a to display the screen on the LCD 16.

The RAM 12 is a rewritable transitory memory which has a temporary area for temporarily storing various data when the CPU 10 executes the control program 11a. This temporary area is provided with the LCD buffer 12a for temporarily storing the display data required for the screen to be displayed on the LCD 16.

The LCD 16 is a liquid crystal display. The touch panel 17 is provided on a display screen of the LCD 16. When the user touches the display screen of the LCD 16, the touch panel 17 detects a location and a type of the touch and inputs them into the MFP 1. The scanner 18 reads a document and converts it to image data. The printer 19 prints an image on a recording sheet based on image data. The NCU 20 controls a telephone line. The modem 21 modulates a transmission signal when a facsimile is transmitted, and demodulates a received modulated signal when a facsimile is received. The USB I/F 22 is a device that allows an external device, e.g., a PC, to establish a communicable connection with the MFP 1 via a USE cable. This USE I/F 22 is constituted by a well-known device. The memory-card I/F 23 is an interface in which a non-transitory storage medium, not shown, in the form of a memory card is installed. The memory-card I/F 23 controls writing and reading of data to and from the memory card.

Figure 3:
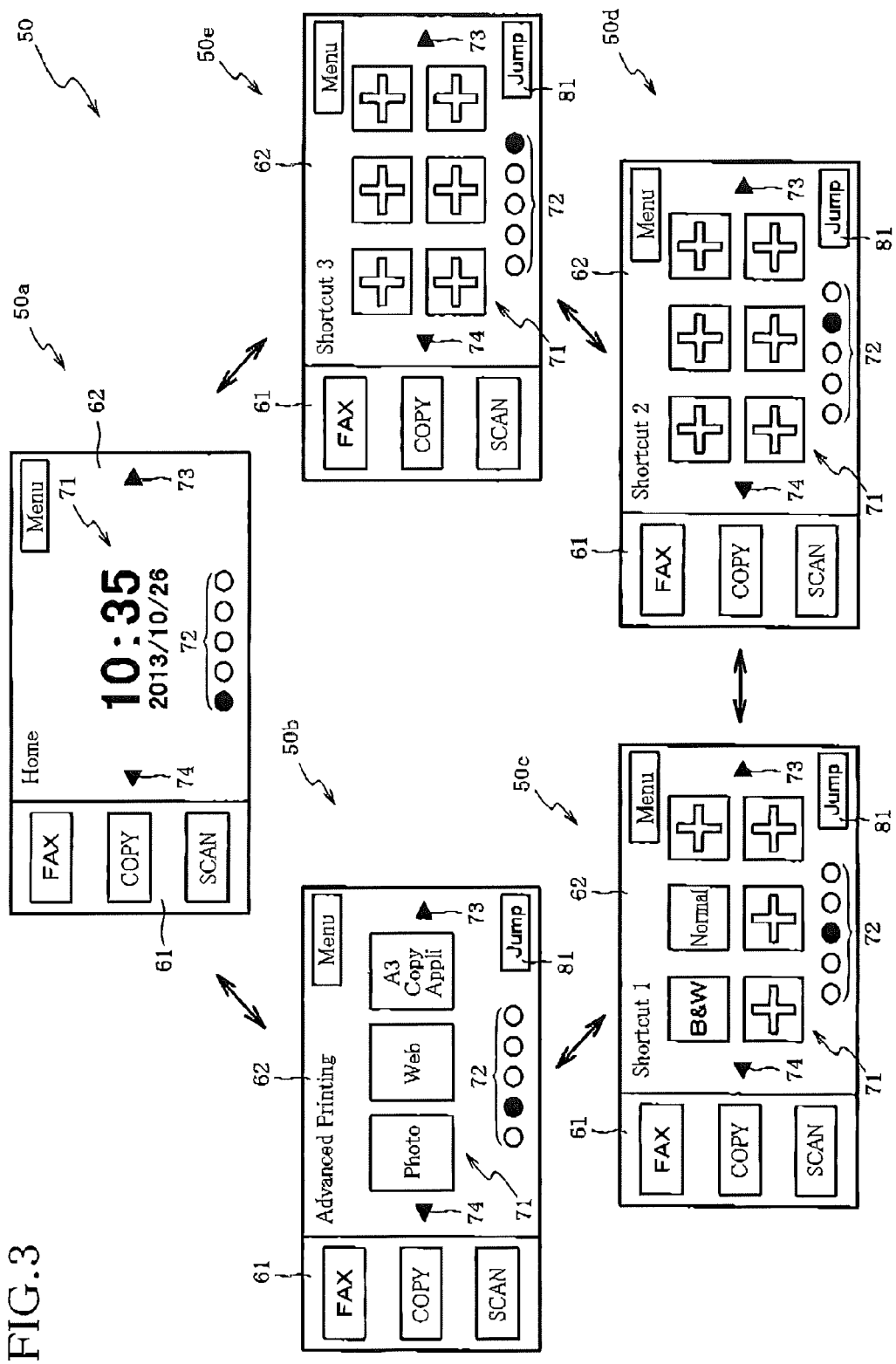
FIG. 3 is a schematic view showing one example of a cyclically-arranged screen set.

As shown in FIG. 2, the screen information table 11b includes storage areas 11b1-11b4, each of which can store a set value or values for the five screens constituting the cyclically-arranged screen set 50 (see FIG. 3).

The storage area 11b1 stores screen numbers which are assigned to the respective five screens 50a-50e (see FIG. 3) of the cyclically-arranged screen set 50. It is noted that the screen numbers 1-5 stored in the storage area 11b1 correspond to the respective screens 50a-50e. The storage area 11b2 stores names of the screens corresponding to the respective screen numbers 1-5.

The storage area 11b3 stores predefined screen flags for the screens corresponding to the respective screen numbers 1-5. Each of the predefined screen flags is a flag which indicates whether a corresponding one of the screens is the predefined screen Specifically, if the predefined screen flag is "1", the screen corresponding to this flag is the predefined screen. On the other hand, if the predefined screen flag is "0", the screen corresponding to this flag is not the predefined screen. In the present embodiment, the user can perform a predetermined operation to set one screen as the predefined screen among the five screens of the cyclically-arranged screen set 50. Thus, among the predefined screen flags stored in the storage area 11b3, only one flag is set to "1" while the other flags are set to "0". In the example shown in FIG. 2, the predefined screen flag for the screen corresponding to the screen number 1 is "1", and consequently the screen 50a (see FIG. 3) that is the screen corresponding to the screen number 1 is set as the predefined screen. It is noted that when the predefined screen is changed with the predetermined operation, settings of the predefined screen flags stored in the storage area 11b3 are changed accordingly.

The five screens include screens that contain a plurality of shortcut buttons, on each of which the user can register a function (hereinafter these screens may be referred to as "function screens"). The storage area 11b4 stores values (information) each of which indicates a registration status of a function on a corresponding one of the shortcut buttons for each function screen. In the present embodiment, three screens corresponding to the respective screen numbers 3-5, namely, the screens 50c-50e (see FIG. 3) are the function screens. Accordingly, for the screens 50c-50e corresponding to the respective screen numbers 3-5, the storage area 11b4 stores the values (information) each indicating the registration status of the function on the corresponding shortcut button. On the other hand, no shortcut buttons are contained in each of the screens corresponding to the respective screen numbers 1, 2, and the storage area 11b4 stores no values (information) for them.

Six areas 11b4a-11b4f store the values each indicating the registration status of the function on the corresponding one of the six shortcut buttons 1-6 contained in each of the function screens. Specifically, when a function is registered on a certain shortcut button, functional information corresponding to the registered function is stored in a corresponding one of the areas 11b4a-11b4f. When the user operates the shortcut button on which the function has been registered, the registered function is implemented based on the functional information stored in one of the areas 11b4a-11b4f which corresponds to the operated shortcut button. On the other hand, "0" is stored for the shortcut button on which no function is registered.

In the example shown in FIG. 2, functions corresponding to "B&W" and "NORMAL" are respectively registered on two shortcut buttons 1, 2 contained in the screen corresponding to the screen number 3. For example, "B&W" stored in the area 11b4a for the screen number 3 is a value which corresponds to a setting customized by the user for black copy. A set value stored in a predefined area in the flash memory 11 is assigned to this value. Thus, when the user operates the shortcut button corresponding to "B&W" which is displayed on the screen 50c (see FIG. 3), the black copy is carried out with the set value corresponding to "B&W" stored in the area 11b4a for the screen number 3. On the other hand, no function is registered on the other shortcut buttons 4-6 contained in the screen corresponding to the screen number 3. Also, no function is registered on the shortcut buttons contained in the screens corresponding to the screen numbers 4, 5.

As shown in FIG. 3, the cyclically-arranged screen set 50 is constituted by the five screens 50a-50e cyclically arranged in order. That is, the screen displayed on the LCD 16 can be switched in the following order: the screen 50a, the screen 50b, the screen 50c, the screen 50d, the screen 50e, the screen 50a, the screen 50b, and so on, and can also be switched in the following reverse order: the screen 50e, the screen 50d, the screen 50c, the screen 50b, the screen 50a, the screen 50e, the screen 50d, and so on. In the present embodiment, the display of the cyclically-arranged screen set 50 is started with the display of the screen 50a as the predefined screen when the MFP 1 is turned on or when the implementation of the function such as the copying function is finished.

Each of the screens 50a-50e includes: a display region 61 on which images used for the screens 50a-50e in common are displayed; and a display region 62 on which different images for each of the screens 50a-50e are displayed. On the display region 61, there are displayed a plurality of function buttons each for starting implementation of a corresponding function such as the facsimile function. On the display region 62, there are displayed various images including: an image 71 which is different for each of the screens 50a-50e; an image 72 which indicates a location of the currently displayed screen in the cyclically-arranged screen set 50; and the next-screen transition buttons 73, 74 each of which causes a screen transition from the currently displayed screen to a next screen.

The image 71 displayed on the screen 50a represents a date and time. The image 71 displayed on the screen 50b contains function buttons each for causing implementation of a corresponding one of advanced printing functions. In an example shown in FIG. 3, the image 71 displayed on the screen 50b contains three function buttons specific to the screen 50b. The image 71 displayed on the screens 50c-50e each as the function screen contains the shortcut buttons. In the example shown in FIG. 3, the image 71 displayed on each of the screens 50c-50e contains the six shortcut buttons. Each shortcut button with the registered function is displayed in a manner corresponding to the registered function. In the example shown in FIG. 3, among the shortcut buttons displayed on the screen 50c, the two buttons with texts "B&W" and "NORMAL" are the shortcut buttons with the registered functions. It is noted that the buttons with the texts "B&W" and "NORMAL" are buttons for which the values assigned to their respective functions are stored respectively in the area 11b4a and the area 11b4b for the screen number 3 in the screen information table 11b. On the other hand, each shortcut button on which no function has been registered has the same external appearance, for example, each shortcut button is a button with a cross being displayed thereon.

The image 72 is constituted by five circles respectively corresponding to the screens of the cyclically-arranged screen set 50. One of the circles which corresponds to the screen number of the currently displayed screen is displayed in a different manner from the others (for example, the circle is painted out) to indicate the location of the currently displayed screen in the cyclically-arranged screen set 50. The next-screen transition button 73 is a button which causes a transition of the screen displayed on the LCD 16 in the following order (noted that the number in parentheses represents the screen number): the screen 50*a* (1), the screen 50*b* (2), the screen 50*c* (3), the screen 50*d* (4), the screen 50*e* (5), the screen 50*a* (1), and so on. It is noted that the order of the screens switched by the next-screen transition button 73 may be hereinafter referred to as "ascending order". This ascending order is an order from a small screen number toward a large screen number. On the other hand, the next-screen transition button, 74 is a button which causes a transition of the screen displayed on the LCD 16 in the following order (noted that the number in parentheses represents the screen number): the screen 50*e* (5), the screen 50*d* (4), the screen 50*c* (3), the screen 50*b* (2), the screen 50*a* (1), the screen 50*e* (5), and so on. It is noted that the order of the screens (the screen numbers) switched by the next-screen transition button 74 may be hereinafter referred to as "descending order". This descending order is an order from a large screen number toward a small screen number.

A predefined-screen transition button 81 is displayed on each of the screens 50*b*-50*e*. The predefined-screen transition button 81 is a button which causes a switch from the currently displayed screen to the predefined screen. Providing this predefined-screen transition button 81 allows the user to command the LCD 16 to display the predefined screen with a single operation without a need to repeat the flick operation or the operation on the next-screen transition button 73 or 74 until the predefined screen is displayed. It is noted that the predefined-screen transition button 81 is not displayed on the screen set as the predefined screen, in the present embodiment, the screen 50*a*.

When the user operates or touches the predefined-screen transition button 81, the MFP 1 according to the present embodiment scrolls the screens from the currently displayed screen to the predefined screen. In the present embodiment, when the user operates the predefined-screen transition button 81, the CPU 10 compares the number of screens to be displayed by the scrolling from the currently displayed screen to the predefined screen in the ascending order and the number of screens to be displayed by the scrolling from the currently displayed screen to the predefined screen in the descending order and then determines one of the ascending order and the descending order with the fewer number of screens to be displayed (i.e., the fewer number of the transition screens) as the direction of the screen transition (i.e., the order in which the screen number is changed). In other words, the CPU 10 determines one of the ascending order and the descending order which one causes fewer screen transitions, as the direction of the screen transition. Therefore, it is possible to reduce the number of the screen transitions during the scrolling (i.e., the number of screens which are viewed by the user during the scrolling), thereby reducing an amount of lowering of visual recognizability of the screens when the predefined-screen transition button 81 is operated. This allows the user to easily recognize the screen transitions during the scrolling.

In addition, in the MFP 1 according to the present embodiment, in a case where the CPU 10 calculates the number of transition screens when the screens are scrolled from the currently displayed screen in the ascending order and the number of transition screens when the screens are scrolled from the currently displayed screen in the descending order, the CPU 10 makes the calculation by excluding the number of function screens in each of which no function has been registered on any of the shortcut buttons among the function screens (the screens 50*c*-50*e*). It is noted that such a function screen may be hereinafter referred to as "no-function registered screen". There is not much need for the user to visually recognize the no-function registered screens during the scrolling from the currently displayed screen to the predefined screen. In this MFP 1, the CPU 10 calculates the number of transition screens by excluding the number of the no-function registered screens and inhibits the display of the no-function registered screens during the scrolling from the currently displayed screen to the predefined screen. Thus, the user views the less number of screens during the scrolling, allowing the user to recognize the screen transitions during the scrolling more easily.

Figure 4:
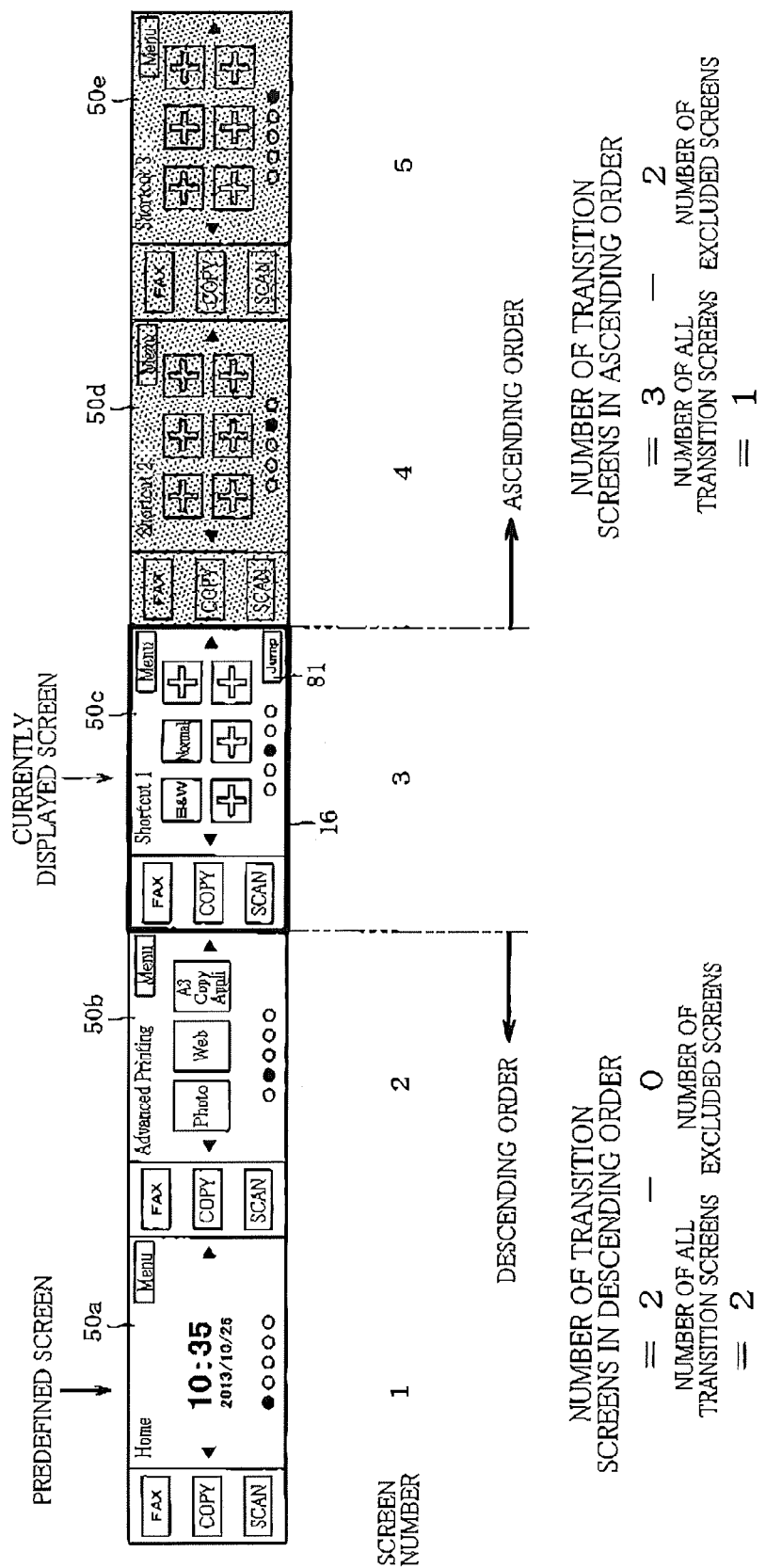
FIG. 4 is a schematic view for explaining calculation of a moving distance from a currently displayed screen to a predefined screen.

FIG. 4 is a schematic view for explaining the calculation of the number of transition screens from the currently displayed screen to the predefined screen. Since the cyclically-arranged screen set 50 is, as described above, constituted by the five screens 50*a*-50*e* cyclically arranged in order, the screens 50*a*-50*e* are arranged in the order of the screen numbers in FIG. 4 to represent continuity of the display screens when the cyclically-arranged screen set 50 is scrolled in the order of the arrangement. In the example shown in FIG. 4, the screen 50*c* is displayed on a display region of the LCD 16 (within a bold-line box), and now suppose the user operates the predefined-screen transition button 81 displayed on the screen 50*c*. It is noted that the hatched screens 50*d*, 50*e* are the no-function registered screens.

Without the no-function registered screens being considered, the screens transited in the order of the arrangement of the cyclically-arranged screen set 50 during the scrolling from the screen 50*c* as the currently displayed screen to the screen 50*a* as the predefined screen include the screens 50*d*, 50*e* and the screen 50*a* as the predefined screen where the order of the switch of the screen numbers is the ascending order and include the screen 50*b* and the screen 50*a* where the order of the switch of the screen numbers is the descending order. That is, without the no-function registered screens being considered, the number of the screens transited in the order of the arrangement of the cyclically-arranged screen set 50 during the scrolling from the screen 50*c* to the screen 50*a* (hereinafter the number may be referred to as "number of all the transition screens") is three where the order is the ascending order and is two where the order is the descending order.

As described above, when determining the direction of the screen transition, the CPU 10 makes the calculation by excluding or subtracting the number of the no-function registered screens from the number of all the transition screens. The number of the no-function registered screens may be hereinafter referred to as "number of the excluded screens". In the example shown in FIG. 4, since the no-function registered screens are the screens 50*d*, 50*e*, the number of the excluded screens is two where the order of the switch of the screen numbers is the ascending order, and the number of the excluded screens is zero where the order of the switch of the screen numbers is the descending order. Thus, the number of transition screens used for the determination of the direction of the screen transition is 1 (=3−2) where the order of the switch of the screen numbers is the ascending order, and the number of transition screens is 2 (=2−0) where the order of the switch of the screen numbers is the descending order. As a result, the ascending order that causes the fewer number of the screen transitions than the descending order is determined as the direction of the screen transition.

There will be next explained the scrolling from the currently displayed screen to the predefined screen with reference to FIGS. 5A-5D. It is noted that FIGS. 5A-5D show the scrolling in a case where the predefined-screen transition button 81 has been operated in the example shown in FIG. 4.

Figure 5A:
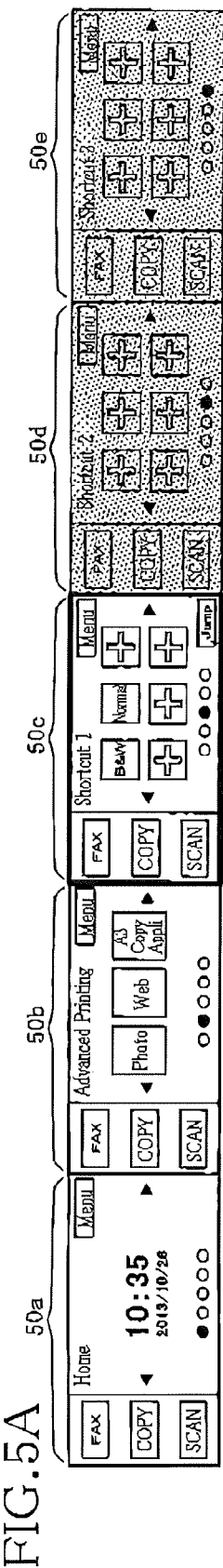
FIGS. 5A-5D are schematic views for explaining scrolling from the currently displayed screen to the predefined screen.

FIG. 5A is a view showing the state in which the screen 50c is displayed on the display region of the LCD 16 (within a bold-line box). As described above, when the predefined-screen transition button 81 on the screen 50c is operated in the example shown in FIG. 4, the ascending order is determined as the direction of the screen transition. That is, the screens to be displayed on the LCD 16 are scrolled in a direction in which the screen numbers are changed in the order of 1, 2, 3, 4, 5, 1, and so on. Thus, when the predefined-screen transition button 81 on the screen 50c is operated with the screen 50e being displayed on the LCD 16, the screen 50c starts to be scrolled leftward as viewed from the front of the display region of the LCD 16. When the scrolling is started, a screen to be displayed following the screen 50c in the order of the arrangement of the cyclically-arranged screen set 50 starts to be displayed continuously to the screen 50c from the right side as viewed from the front of the display region of the LCD 16.

Figure 5B:
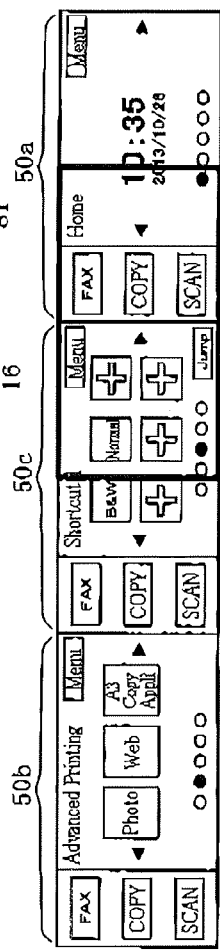
Figure 5C:
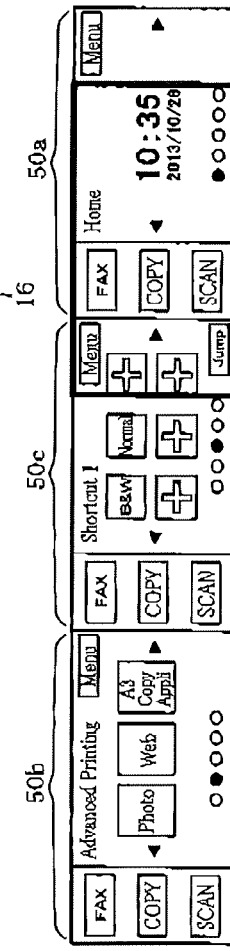
Figure 5D:
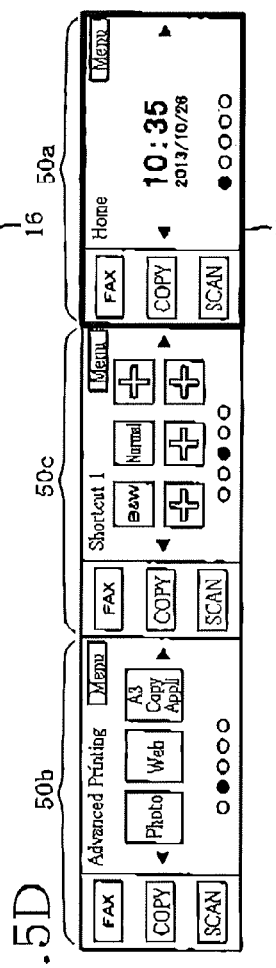

FIGS. 5B-5D show a process of the scrolling from the screen 50c to the predefined screen 50a after the predefined-screen transition button 81 on the screen 50c is operated. The screens 50d, 50e corresponding to the respective screen numbers 4, 5 are the no-function registered screens. In the present embodiment, the no-function registered screens, i.e., the screens 50d, 50e are excluded from the screens to be displayed during the scrolling from the currently displayed screen to the predefined screen. Thus, the screen following the screen 50c in the order of the arrangement of the cyclically-arranged screen set 50 is the predefined screen 50a corresponding to the screen number 1. When the scrolling is started in response to the operation on the predefined-screen transition button 81 on the screen 50c, as shown in FIG. 5B, the screen 50c is gradually scrolled leftward and disappears from the display region of the LCD 16. Meanwhile, the screen 50a as the next screen in the ascending order gradually appears from the opposite side, i.e., the right side. It is noted that, among the two screens displayed on the LCD 16, a screen which disappears by the scrolling may be hereinafter referred to as "disappearing screen". After the start of the scrolling, as shown in FIG. 5C, a ratio of the screen 50c as the disappearing screen to the display region decreases with a lapse of time, and accordingly a ratio of the screen 50d as the next screen to the display region increases. Finally, as shown in FIG. 5D, an entirety of the screen 50a as the predefined screen is displayed.

There will be next explained, with reference to FIG. 6, a cyclically-arranged-screen-set display processing executed by the CPU 10 of the MFP 1 according to the control program 11a. The cyclically-arranged-screen-set display processing is a processing for displaying the cyclically-arranged screen set 50 (i.e., the screens 50a-50e) on the LCD 16. The cyclically-arranged-screen-set display processing is started when the MFP 1 is turned on, or when a command for displaying the cyclically-arranged screen set 50 is inputted in a state in which a screen that is not included in the cyclically-arranged screen set 50 is displayed, or when the implementation of the function such as the copying function is finished. It is noted that the screen 50a is set as the predefined screen.

Initially at S601, the CPU 10 displays the predefined screen 50a of the cyclically-arranged screen set 50 on the LCD 16. When the screen being displayed on the LCD 16 is a screen that is different from the predefined screen 50a (any of the screens 50b-50e) (S602: No), the CPU 10 at S603 displays the predefined-screen transition button 81 on the currently displayed screen, and this display processing goes to S604. On the other hand, when the screen being displayed on the LCD 16 is the predefined screen 50a (S602: Yes), this display processing goes to S604. According to S602 and S603, the predefined-screen transition button 81 is displayed only when the screen being displayed on the LCD 16 is the screen different from the predefined screen 50a and not displayed when the screen being displayed on the LCD 16 is the predefined screen 50a.

When the CPU 10 at S604 receives a user input from the touch panel 17 (S604: Yes), this display processing goes to S605. On the other hand, when the CPU 10 receives no user input from the touch panel 17 (S604: No), this display processing returns to S604. The CPU 10 at S605 analyzes the user input. In the present embodiment, the user input which can be performed during the display of the cyclically-arranged screen set 50 includes: an instruction for a screen transition to the screen other than the cyclically-arranged screen set 50 (e.g., the operation on one of the function buttons displayed on the display region 61); the operation on the predefined-screen transition button 81; and an instruction for one of the other screen transitions in the cyclically-arranged screen set 50 (e.g., the flick operation or the operation on the next-screen transition button 73 or 74).

When a result of the analysis of the user input shows that the user input is the instruction for the screen transition to the screen other than the cyclically-arranged screen set 50 (e.g., the operation on one of the function buttons displayed on the display region 61) (S606: Yes), this display processing ends. On the other hand, the result of the analysis of the user input shows that the user input is not the operation on the predefined-screen transition button 81, that is, the user input is the flick operation or the operation on the next-screen transition button 73 or 74 (S607: No), the CPU 10 at S613 stores the direction of the screen transition (the ascending order or the descending order) for this operation into the transition direction memory 11c. At S614, the CPU 10 executes, as a screen display processing, a processing for displaying a destination screen in response to the flick operation or the operation on the next-screen transition button 73 or 74, and the processing returns to S602.

When the result of the analysis of the user input shows at S607 that the user input is the operation on the predefined-screen transition button 81 (S607: Yes), the CPU 10 at S608 executes a transition-direction determination processing for determining the direction of the screen transition. It is noted that this transition-direction determination processing will be explained later in detail with reference to FIG. 7. The CPU 10 at S609 determines a scroll speed based on the number of transition screens in the transition direction that has been determined in the transition-direction determination processing (S608). The scroll speed determined at S609 is a moving amount (distance) by which the screens displayed on the LCD 16 (i.e., the disappearing screen and the next screen) are moved per frame. In the present embodiment, a length of time from the operation on the predefined-screen transition button 81 to the display of the predefined screen 50a is a constant length of time regardless of the number of transition screens. Thus, the fewer the number of transition screens, the slower the scroll speed is. Also, in the present embodiment, the number of frames displayed per second is fixed (for example, the number is 20 fps). Thus, the fewer the number of transition screens, the greater the moving amount of each screen per frame is.

At S610, the CPU 10, based on the determined scroll speed, calculates an amount of the movement of the images displayed in the current frame to determine contents of a screen to be displayed in the next frame. At S611, the CPU 10 executes an LCD display processing for controlling the LCD 16 to display the screen for the next frame based on the determined display contents. Specifically, in the LCD display processing (S611), the CPU 10 displays the screen for the next frame on the LCD 16 by reading required background images and parts images from the display image memory 11d based on the determined display contents and then creating image data in the LCD buffer 12a, which image data is representative of the screen for the next frame in which the read images are arranged based on the determined display contents. After S611, when the screen being displayed on the LCD 16 is not the predefined screen 50a (S612: No), this display processing returns to S610 at which the screen for the next frame is created and displayed on the LCD 16. On the other hand, when the screen being displayed on the LCD 16 is the predefined screen 50a (S612: Yes), this display processing returns to S602.

There will be next explained the transition-direction determination processing (S608) with reference to FIG. 7. This transition-direction determination processing begins with S701 at which the CPU 10 calculates the number of all the transition screens from the currently displayed screen to the predefined screen 50a in the ascending order of the screen numbers and the number thereof in the descending order. When the transition screens include one or more no-function registered screens in the ascending order (S702: Yes), the CPU 10 at S703 calculates the number of the no-function registered screens (the number of the excluded screens) in the ascending order, and this determination processing goes to S704. On the other hand, when the transition screens do not include any no-function registered screens in the ascending order (S702: No), this determination processing goes to S704. When the transition screens include one or more no-function registered screens in the descending order (S704: Yes), the CPU 10 at S705 calculates the number of the no-function registered screens (the number of the excluded screens) in the descending order, and this determination processing goes to S706. On the other hand, when the transition screens do not include any no-function registered screens in the descending order (S704: No), this determination processing goes to S706.

At S706, the CPU 10 calculates the number of transition screens (="the number of all the transition screens"−"the number of the excluded screens") in the ascending order and the number of transition screens in the descending order. When the calculated number of transition screens in the ascending order and the calculated number of transition screens in the descending order are different from each other (S707: No), the CPU 10 at S708 determines, as the transition direction, one of the ascending order and the descending order with a fewer number of transition screens. On the other hand, when the calculated number of transition screens in the ascending order and the calculated number of transition screens in the descending order are equal to each other (S707: Yes), the CPU 10 at S710 determines, as the transition direction, a direction that is opposite to the transition direction stored in the transition direction memory 11c. That is, where the value stored in the transition direction memory 11c is a value indicative of the ascending order, the descending order is determined as the transition direction. On the other hand, where the value stored in the transition direction memory 11c is a value indicative of the descending order, the ascending order is determined as the transition direction. Following S708 or S710, the CPU 10 at S709 sets the no-function registered screen(s) present in the transition direction, such that the no-function registered screen(s) do not appear on the LCD 16 during the scrolling, and this determination processing ends.

In the MFP 1 according to the present embodiment as described above, when the predefined-screen transition button 81 is operated, the screens are scrolled from the currently displayed screen to the predefined screen. Thus, the user can easily recognize the screen transitions from the currently displayed screen to the predefined screen, and feelings of operating the screen can be given to the user. In particular, when the predefined-screen transition button 81 is operated, the CPU 10 determines, as the direction of the screen transition, one of the number of transition screens where the screen number is switched in the ascending order of the screen numbers and the number of transition screens where the screen number is switched in the descending order of the screen numbers, which one is smaller in the number of transition screens than the other. Therefore, it is possible to reduce the number of screens which are viewed by the user during the scrolling as few as possible, thereby making it possible, when the predefined-screen transition button 81 is operated, to reduce the amount of the lowering of the visual screen recognizability before the predefined screen is displayed. This allows the user to easily recognize the screen transitions during the scrolling. Therefore, it is possible to enhance convenience to the user when the cyclically-arranged screen set 50 is displayed.

In the MFP 1 according to the present embodiment, the CPU 10 calculates the number of transition screens by excluding the number of the no-function registered screens to determine the transition direction. Thus, the number of transition screens can be calculated as a smaller value. Also, since the no-function registered screens are excluded from the screens to be displayed, the user views the less number of screens during the scrolling, allowing a slower speed of the scrolling. Thus, the user can recognize the screen transition during the scrolling more easily.

In the MFP 1 according to the present embodiment, the predefined-screen transition button 81 is displayed only when the screen being displayed on the LCD 16 is the screen different from the predefined screen 50a, and is not displayed on the predefined screen 50a. That is, the predefined-screen transition button 81 is configured not to be operable when the predefined screen 50a is being displayed on the LCD 16. When the predefined screen 50a is being displayed on the LCD 16, there is no need for the user to operate the predefined-screen transition button 81 which is the button for causing the screen transition to the predefined screen 50a. Therefore, since the predefined-screen transition button 81 is not displayed on the predefined screen 50a in the present embodiment, the user can be prevented from performing the needless operation, which causes an unnecessary load of the control.

In the MFP 1 according to the present embodiment, when the calculated number of transition screens in the ascending order and the calculated number of transition screens in the descending order are equal to each other (S707: Yes); the CPU 10 at S710 determines, as the transition direction, the direction that is opposite to the transition direction stored in the transition direction memory 11c. That is, if the positive decision is obtained at S707, the MFP 1, based on a switching order responsive to a previous image switch command, switches or scrolls the images in order in which the images are returned, thereby giving less discomfort to the user.

In the above-described embodiment, the MFP 1 is one example of a display apparatus. The LCD 16 is one example of a display. The flash memory 11 is one example of a storage.

The predefined-screen transition button 81 is one example of an operation unit. The CPU 10 can be considered to include an image display unit that can execute the processings at S601 and S614. The CPU 10 can also be considered to include a display switching unit that can execute the processings at S610-S612 and S614. The CPU 10 can also be considered to include a command receiving unit that can execute the processings at S603, S604, and S605 and for the positive decision at S607. The CPU 10 can also be considered to include an image-number obtaining unit that can execute the processings at S701-S706. The CPU 10 can also be considered to include a switching-order determining unit that can execute the processings at S708 and S710. The CPU 10 can also be considered to include a display-data creating unit that can execute the processing at S610 and S709. The CPU 10 can also be considered to include a second-command receiving unit that can execute the processings at S604 and S605 and for the negative decision at S607. The CPU 10 can also be considered to include a switching-order storing unit that can execute the processing at S613.

While the embodiment of the present invention has been described above, it is to be understood that the invention is not limited to the details of the illustrated embodiment, but may be embodied with various changes and modifications, which may occur to those skilled in the art, without departing from the spirit and scope of the invention.

For example, while the present invention is applied to the multifunction device in the form of the MFP 1 in the above-described embodiment, the present invention is applicable to any device that is configured to display a plurality of screens such as the cyclically-arranged screen set 50 which are switchable cyclically in a predetermined display order.

While one of the screens 50*a*-50*e* is switched to another in the above-described embodiment, the present invention is applicable to a display apparatus configured to display a plurality of icon images such that these icon images can be switched cyclically in a predetermined display order. For example, the MFP 1 may be configured as follows: when the user operates one button in a state in which some of the icon images switchable cyclically in the predetermined display order are being displayed on the LCD 16, the icon images are scrolled in a transition direction with the fewer number of transition images such that one icon image being in a selected state (in an active state) and displayed in a manner different from that of the other images among the icon images being displayed is switched to an icon image as the predefined image.

Figure 8A:
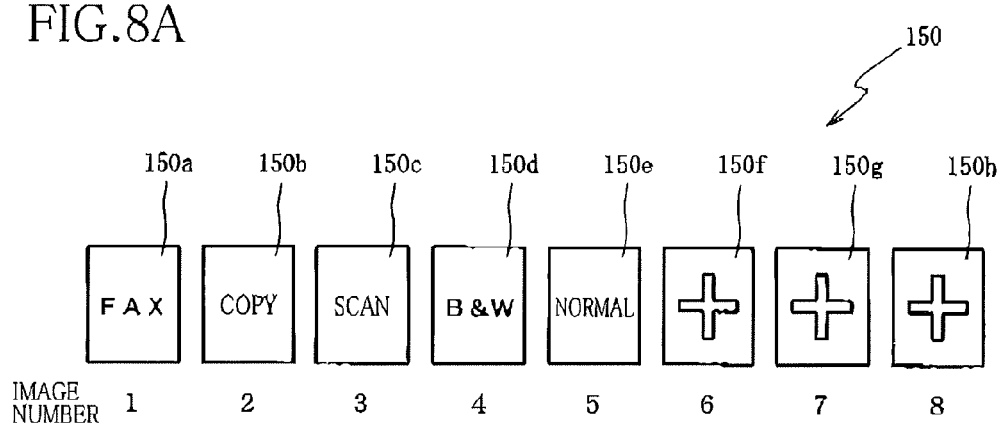
FIGS. 8A and 8B are views for explaining a modification.
Figure 8B:
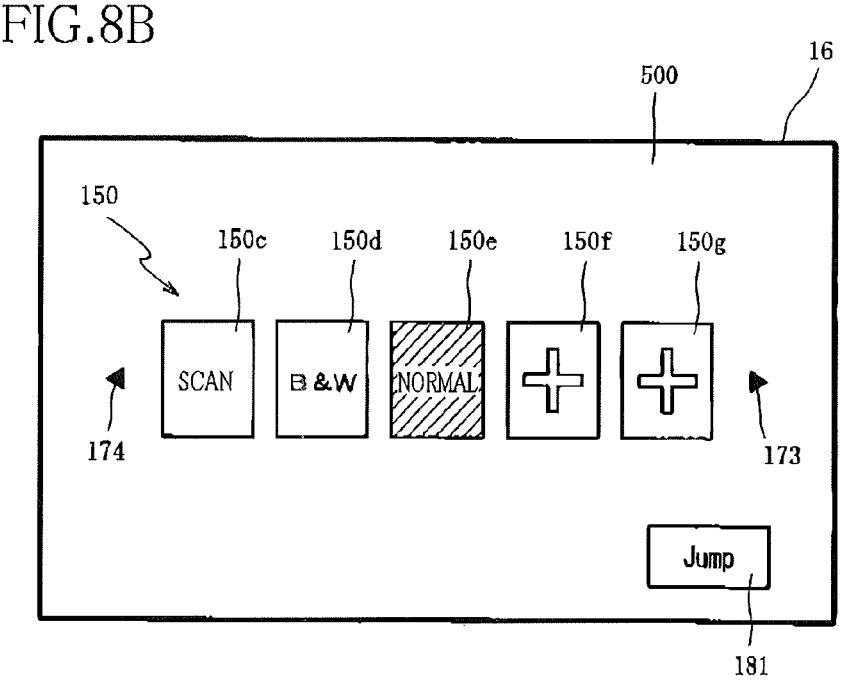

FIG. 8 is a view for explaining this modification. It is noted that the same reference numerals as used in the above-described embodiment are used to designate the corresponding elements of this modification, and an explanation of which is dispensed with. As shown in FIG. 8A, there is a cyclically-arranged icon set 150 which is constituted by a plurality of icon images 150*a*-150*h* respectively corresponding to image numbers 1-8. This cyclically-arranged icon set 150 is contained in a screen 500 displayed on the LCD 16 such that some of the icon images 150*a*-150*h* are arranged in order of their respective image numbers. In an example shown in FIG. 8B, the screen 500 contains five icon images 150*c*-150*g* (icon images respectively having image numbers 3-7) of the cyclically-arranged icon set 150. An icon image located in the middle of the five icon images 150*c*-150*g* displayed on the screen 500 (in this example, the icon image 150*e*) is automatically changed to the selected state (the active state) and displayed in a manner different from that of the other icon images. For example, the icon image in the selected state is displayed in a different color from that of the other images. In the example shown in FIG. 8B, the icon image 150*e* being in the selected state is hatched to indicate a difference in the display manner from the icon images 150*c*, 150*d*, 150*f*, 150*g* each not being in the selected state.

The screen 500 for displaying the cyclically-arranged icon set 150 contains next-image transition buttons 173, 174. The next-image transition button 173 is a button which causes an image transition such that a leftmost icon image as viewed from the front of the screen 500 is dismissed, the currently-displayed icon images are moved leftward, and an icon image whose image number is next larger than a rightmost icon as viewed from the front of the screen 500 is displayed from the right side of the screen 500. On the other hand, the next-image transition button 174 is a button which causes an image transition such that a rightmost icon image as viewed from the front of the screen 500 is dismissed, the currently-displayed icon images are moved rightward, and an icon image whose image number is next smaller a leftmost icon as viewed as viewed from the front of the screen 500 is displayed from the left side of the screen 500. That is, the next-image transition button 173 is a button for switching the icons of the cyclically-arranged icon set 150 displayed on the screen 500 in the ascending order, i.e., in increasing order of the image number while the next-image transition button 174 is a button for switching the icons of the cyclically-arranged icon set 150 displayed on the screen 500 in the descending order, i.e., in decreasing order of the image number.

The screen 500 contains a predefined-image transition button 181 which has a function similar to that of the predefined-screen transition button 81 in the above-described embodiment. The predefined-image transition button 181 is a button which causes image transitions such that an icon image which is defined as a reference in advance (hereinafter may be referred to as "predefined image") is moved to a position at which the predefined image becomes the selected state (i.e., the position in the middle of the plurality of icon images displayed on the screen 500). In this modification, the predefined-image transition button 181 is one example of the operation unit. It is noted that the predefined image is one of the icon images that constitute the cyclically-arranged icon set 150, and the user can set the predefined image as needed like the predefined screen in the above-described embodiment. As in the above-described embodiment, providing the predefined-image transition button 181 allows the user to command the LCD 16 to display the predefined image in the selected state with a single operation without a need to repeat the flick operation or the operation on the next-image transition button 173 or 174 until the predefined image is displayed. It is noted that the predefined-image transition button 181 is preferably not displayed when the icon image being in the selected state is the predefined image.

When the predefined-image transition button 181 is operated, the CPU 10 may calculate the number of transition images from the icon image being in the selected state to the predefined image in the ascending order and the number of transition images from the icon image being in the selected state to the predefined image in the descending order, and then the icon images may be scrolled in a transition direction with the fewer number of transition images. The scroll speed may be calculated according to the number of transition images. For example, to display each of the icon images of the cyclically-arranged icon set 150 on the screen 500, each icon image may be moved by the same amount (i.e., the same distance in the scroll direction) with the operation, e.g., on the next-image transition button 173 or 174. That is, the scrolling of the icon image may be designed such that even where the icon images of the cyclically-arranged icon set 150 have different sizes and/or shapes from one another, such a difference has no effect on the moving speed. It is noted that the scroll speed may be calculated, taking into consideration the size and/or shape of each of the icon images of the cyclically-arranged icon set 150. The MFP as the above-described modification may be configured such that the cyclically-arranged icon set 150 contains one or more shortcut buttons on each of which the user can register a function. Where the cyclically-arranged icon set 150 includes any shortcut button on which no function has been registered in such a configuration, the number of the images representative of the shortcut buttons may be excluded from the number of all the transition images as in the above-described embodiment.

In a case where images corresponding to a plurality of setting items are arranged so as to be scrollable in a predetermined display order instead of the plurality of icon images (the cyclically-arranged icon set 150) switchable cyclically in the predetermined display order as in the above-described modification, the present invention may be applied to the switch of such images.

While the length of time from the operation on the predefined-screen transition button 81 to the display of the predefined screen is fixed in the above-described embodiment, the scroll speed of the screens (i.e., a speed of the switch of the screen) may be fixed. As described above, when the predefined-screen transition button 81 is operated, the CPU 10 determines, as the direction of the screen transition, one of the number of transition screens where the screen is switched in the ascending order of the screen numbers and the number of transition screens where the screen is switched in the descending order of the screen numbers, which one is smaller in the number of transition screens than the other. In this case, where the scroll speed is fixed, the fewer the number of transition screens, the shorter the length of time from the operation on the predefined-screen transition button 81 to the display of the predefined screen can be made.

In the above-described embodiment, the number of all the transition screens is the number which is obtained by adding the number of the predefined screen to the number of screens between the currently displayed screen and the predefined screen, that is, the currently displayed screen is not considered for the counting of the number of all the transition screens. Instead of this configuration, the number of all the transition screens may be the number of the screens between the currently displayed screen and the predefined screen without considering the currently displayed screen and the predefined screen. In another modification, the number of all the transition screens may be the number which is obtained by adding the number of the currently displayed screen to the number of the screens between the currently displayed screen and the predefined screen, that is, the predefined screen is not considered for the counting of the number of all the transition screens. In another modification, the number of all the transition screens may be the number which is obtained by adding the number of the currently displayed screen and the number of the predefined screen to the number of the screens between the currently displayed screen and the predefined screen. That is, the number of all the transition screens only needs to be the number of screens that are present in a predetermined range from the currently displayed screen to the predefined screen.

While the number of transition screens is calculated by excluding the number of the no-function registered screens in the above-described embodiment, the number of transition screens may be calculated without excluding the no-function registered screens. That is, the calculation may be made using the number of all the transition screens as the number of transition screens.

While the number of all the transition screens is calculated for each of the ascending order and the descending order in the above-described embodiment, the CPU 10 may calculate the number of all the transition screens in only one of the ascending order and the descending order. For the number of all the transition screens in the other of the ascending order and the descending order, there may be used a value which is obtained by subtracting the number of all the transition screens calculated for one of the ascending order and the descending order from the number of all the screens constituting the cyclically-arranged screen set 50, which number of all the screens is predefined without calculation as five in the above-described embodiment.

While the transition direction is determined based on the number of transition images in the above-described embodiment, the CPU 10 may calculate a distance which is obtained by multiplying the number of transition images by a width of the display region of the LCD 16 in the scroll direction, to determine the transition direction based on the calculated distance.

While the number of the frames displayed per second is fixed, and the scroll speed (the moving speed of the screen) is calculated as the moving amount of each screen per frame in the above-described embodiment, the scroll speed may be calculated as the number of the frames displayed per second, with the moving amount of each screen per frame being fixed. In this configuration, the fewer the number of transition screens, the fewer the number of the frames displayed per second becomes. For example, where the number of transition screens is three, the number of the frames displayed per second can be made 12 fps, and where the number of transition screens is five, the number of the frames displayed per second can be made 20 fps.

While the predefined-screen transition button 81 is displayed on the LCD 16 and operated by the user using the touch panel 17 in the above-described embodiment, the predefined-screen transition button 81 may be a hard button provided on the MFP 1. In such a configuration, the MFP 1 is configured, for example, such that the CPU 10 enables a receipt of an operation on the hard button where the screen different from the predefined screen is displayed, and the CPU 10 disables the receipt of the operation on the hard button where the predefined screen is displayed. Alternatively, the predefined-screen transition button 81 may be a button of an electrostatic sensor type provided on a housing of the MFP 1. In such a configuration, if the negative decision is obtained at S602, the CPU 10 at S603 may enable a receipt of an operation on the button and control the button to illuminate for allowing the user to recognize it. On the other hand, if the positive decision is obtained at S602, the CPU at S603 may disable the receipt of the operation on the hard button and control the button not to illuminate.

While the number of screens constituting the cyclically-arranged screen set 50 is fixed in the above-described embodiment, the MFP 1 may be configured such that the user can add one or more screens, e.g., the function screens, as needed. Also, the MFP 1 may be configured such that the user can reduce one or more screens, e.g., the function screens, as needed to reduce the number of screens constituting the cyclically-arranged screen set 50.

While each of the screens 50*a*-50*e* of the cyclically-arranged screen set 50 is switched cyclically in the predetermined display order in the above-described embodiment, the screen displayed on the LCD 16 may be switched from the currently displayed screen directly to the predefined screen 50*a* when the command for displaying the cyclically-arranged screen set 50 is inputted in the state in which the screen that is not included in the cyclically-arranged screen set 50 is displayed.

While the predefined screen can be set by the predetermined operation in the above-described embodiment, the MFP 1 may be configured such that the CPU 10 counts the number of operations on each of the screens 50a-50e of the cyclically-arranged screen set 50, and one of the screens 50a-50e with the largest number of operations is automatically set as the predefined screen at a predetermined timing. It is noted that the predetermined timing includes: a timing when the user operates a predetermined button; each timing when the cyclically-arranged-screen-set display processing in FIG. 6 is started; and a timing when the MFP 1 is turned on. Also, in the configuration in which the predefined screen can be set by the predetermined operation, the MFP 1 may be configured such that each no-function registered screen is automatically inhibited from being set as the predefined screen.

While the display region 61 and the display region 62 are both displayed when each of the screens 50a-50e is scrolled in the above-described embodiment, the CPU 10 may scroll only the contents of the display region 62 on which the different images for each of the screens 50a-50e are displayed. In this scrolling, images displayed on the display region 61 such as function buttons and images indicating a status of the MFP 1 are not scrolled and fixed. It is noted that the images indicating the status of the MFP 1 include an image that represents a remaining amount of ink used for the printer 19.

In the above-described embodiment, when the predefined-screen transition button 81 is operated, the screen is switched from the currently displayed screen to the predefined screen without stopping the scrolling. Nevertheless, when the user performs a predetermined operation, e.g., the touch on the screen, during the scrolling caused by the operation on the predefined-screen transition button 81, the CPU 10 may stop the scrolling and display the screen different from the predefined screen. In this case, the CPU 10 displays the screen that is located at the touched position, for example. Alternatively, when two screens, i.e., the disappearing screen and the next screen, are being displayed, the CPU 10 may display one of the two screens which has a larger display area. Since the MFP 1 determines the direction of the screen transition such that the number of the screen transitions during the scrolling is as few as possible, the user can easily recognize the screen transitions during the scrolling. Thus, the configuration mentioned above is preferably employed for the MFP 1.

In the above-described embodiment, the CPU 10 sequentially displays the display data in which the screens are moved by the moving amounts related to the scroll speed during the scrolling. Nevertheless, the CPU 10 may sequentially switch the screen from the currently displayed screen to the predefined screen on a screen-by-screen basis in the determined transition direction (i.e., the ascending order or the descending order). That is, when scrolling the screen from the screen 50c to the predefined screen 50a, for example, the CPU 10 may display the screen 50b after the screen 50c without displaying a part of the screen 50c and a part of the screen 50b at the same time.

What is claimed is:

1. A display apparatus, comprising:
   a display having a display screen;
   a storage configured to store order information representative of a relative display order among a plurality of images to be displayed on the display screen; and
   a processor that, when executing instructions, causes the display apparatus to function as:
   an image display unit configured to display a certain image of the plurality of images at a specific display area on the display screen;
   a first command receiving unit configured to receive an ascending-order switch command which causes the image display unit to switch an image to be displayed at the specific area in an ascending order, the ascending order being an order from a first image toward a last image in the relative display order and is an order in which an image to be displayed following the last image in the relative display order is the first image;
   a first display switching unit configured to switch an image to be displayed at the specific area in the ascending order in response to receiving the ascending-order switch command;
   a second command receiving unit configured to receive a descending-order switch command which causes the image display unit to switch the image to be displayed at the specific area in a descending order, the descending order being an order from the last image toward the first image in the relative display order and is an order in which an image to be displayed following the first image in the relative display order is the last image;
   a second display switching unit configured to switch the image to be displayed at the specific area in the descending order in response to receiving the descending order switch command;
   a third command receiving unit configured, when the certain image of the plurality of images is being displayed at the specific display area on the display by the image display unit, to receive a predefined-image display command which causes the image display unit to display a predefined one of the plurality of images at the specific display area on the display screen as a predefined image;
   a switching-order determining unit configured to compare the number of images present within a range from the certain image being displayed at the specific area of the display screen to the predefined image in the ascending order and the number of images present within the range from the certain image to the predefined image in the descending order and to determine (a) the ascending order as a switching order of the images, when the number of images present within a range from the certain image being displayed at the specific area of the display screen to the predefined image in the ascending order is fewer than the number of images present within a range from the certain image to the predefined image in a descending order, or (b) the descending order as the switching order, when the number of images present within the range from the certain image to the predefined image in the descending order is fewer than the number of images present within the range from the certain image to the predefined image in the ascending order, in response to receiving the predefined-image display command; and,
   a third display switching unit configured to display at least a part of at least one image present within the range from the certain image to the predefined image in the switching order determined by the switching-order determining unit and to display the predefined image at the specified display area on the display screen by switching the image to be displayed at the specific display area on the display screen.

2. The display apparatus according to claim 1, wherein the third command receiving unit is configured to allow the reception of the predefined-image display command in a case where the certain image is being displayed at the specific display area on the display screen by the image display unit, and the predefined image is not being displayed at the specific display area of the display screen.

3. The display apparatus according to claim 1,
wherein the processor that, when executing the instructions, causes the display apparatus to function as an operation unit operable to output the predefined-image display command, and
wherein the third command receiving unit is configured to allow the operation of the operation unit in a case where the certain image is being displayed on the display screen by the image display unit, and the predefined image is not being displayed at the specific display area of the display screen.

4. The display apparatus according to claim 1, wherein the third display switching unit is configured, when the predefined-image display command is received by the third command receiving unit, to switch the image to be displayed on the display screen by moving the image in the switching order determined by the switching-order determining unit at such a speed that a length of time required from the reception to the display of the predefined image on the display screen becomes a specific length of time.

5. The display apparatus according to claim 1,
wherein the processor that, when executing the instructions, causes the display apparatus to function as a display-data creating unit configured, when the predefined-image display command is received by the third command receiving unit, to create display data to display at least one image at the specific display area on the display screen, before the predefined image is displayed, while moving the at least one image by specific moving amounts in the switching order determined by the switching-order determining unit, and
wherein the third display switching unit is configured, when the predefined-image display command is received by the third command receiving unit, to switch the image to be displayed on the display screen by sequentially displaying the at least one image at the specific display area on the display screen based on the display data created by the display-data creating unit.

6. The display apparatus according to claim 5, wherein, when the predefined-image display command is received by the third command receiving unit, the specific moving amount is calculated such that a length of time required from the reception to the display of the predefined image on the display screen becomes a specific length of time.

7. The display apparatus according to claim 1,
wherein the image display unit is configured to display one of a plurality of screens as the certain image to be displayed on the display screen as the specific display area on the display screen, and
wherein, when the one of the plurality of screens is being displayed on the display screen by the image display unit, and the third command receiving unit has received, as the predefined-image display command, a command for displaying on the display screen a predefined one of the plurality of screens which is predefined as a predefined screen, the third display switching unit displays the predefined screen on the display screen by switching a screen to be displayed on the display screen in the switching order determined by the switching-order determining unit.

8. The display apparatus according to claim 7,
wherein the plurality of screens include at least a function screen capable of containing at least one function image therein that is for commanding a predefined function, and
wherein, when the predefined-image display command is received by the third command receiving unit in a case where a function screen not containing the at least one function image therein is present within a range from the one of a plurality of screens being displayed on the display screen to the predefined screen the number that is obtained by subtracting the number of the function screens each not containing the at least one function image therein from the number of the screens present within the range from the one of the plurality of screens to the predefined screen in the ascending order is determined as the number of images in the ascending order, and the number that is obtained by subtracting the number of the function screens each not containing the at least one function image therein from the number of the screens present within the range from the one of the plurality of screens to the predefined screen in the descending order is determined as the number of images in the descending order.

9. The display apparatus according to claim 8,
wherein the processor that when executing the instructions, causes the display apparatus to function as a display-data creating unit configured, when the predefined-image display command is received by the third command receiving unit, to create display data to display at least one screen that does not include the function screen not containing the function image is displayed on the display screen, before the predefined screen is displayed, while moving the at least one screen by specific moving amounts in the switching order determined by the switching-order determining unit, and
wherein the third display switching unit is configured, when the predefined-image display command is received by the third command receiving unit, to switch the screen to be displayed on the display screen by sequentially displaying the at least one screen on the display based on the display data created by the display-data creating unit.

10. The display apparatus according to claim 1,
wherein the processor that when executing the instructions, causes the display apparatus to function as:
a switching-order storing unit configured, when one of the ascending-order switch command and the descending-order switch command is received by one of the first command receiving unit and the third command receiving unit, to store a switching order of the images based on the received switch command, into the storage,
wherein the switching-order determining unit is configured, in a case where the number of images present within the range in the ascending order is equal to the number of images within the range in the descending order, to determine a switching order that is reverse to the received switching order stored by the switching-order storing unit, as the switching order based on the predefined-image display command.

11. The display apparatus according to claim 1,
wherein the image display unit is configured to display the certain image of a plurality of images at the specific display area and the other images of the plurality of images on the display screen as the image to be displayed on the display screen, such that the certain image of the plurality of images being displayed at the specific display area on the display screen is displayed in a different manner from that of the other images of the plurality of images being displayed on the display screen, and, wherein the switching-order determining unit is configured, based on the fewer number of images present within the range from the certain image being displayed at the specific display area on the display screen in the different manner to the predefined image in one order than in the other order of the ascending order and the descending order to determine the one order of the ascending order and the descending order as the switching order of the images in response to receiving the predefined-image display command.

12. A non-transitory storage medium storing a program executed by a computer of a display apparatus comprising a display having a display screen and a storage configured to store order information representative of a relative display order among a plurality of images to be displayed on the display screen, the program designed to have the computer function as:

an image display unit configured to display a certain image of the plurality of images at a specific display area on the display screen;

a first display switching unit configured, when the at least one image of the plurality of images is being displayed at a specific display area on the display screen by the image display unit;

a first command receiving unit configured to receive an ascending-order switch command which causes the image display unit to switch an image to be displayed at the specific area in an ascending order, the ascending order being an order from a first image toward a last image in the relative display order and is an order in which an image to be displayed following the last image in the relative display order is the first image;

a first display switching unit configured to switch an image to be displayed at the specific area in the ascending order in response to receiving the ascending-order switch command;

a second command receiving unit configured to receive a descending-order switch command which causes the image display unit to switch the image to be displayed at the specific area in a descending order, the descending order being an order from the last image toward the first image in the relative display order and is an order in which an image to be displayed following the first image in the relative display order is the last image;

a second display switching unit configured to switch the image to be displayed at the specific area in the descending order in response to receiving the descending order switch command;

a third command receiving unit configured, when the certain image of the plurality of images is being displayed at the specific display area on the display screen by the image display unit, to receive a predefined-image display command which causes the image display unit to display a predefined one of the plurality of images at the specific display area on the display screen as a predefined image;

a switching-order determining unit configured to compare the number of images present within a range from the certain image being displayed at the specific area of the display screen to the predefined image in the ascending order and the number of images present within the range from the certain image to the predefined image in the descending order and to determine (a) the ascending order as a switching order of the images, when the number of images present within a range from the certain image being displayed at the specific area of the display screen to the predefined image in the ascending order is fewer than the number of images present within a range from the certain image to the predefined image in a descending order, or (b) the descending order as the switching order, when the number of images present within the range from the certain image to the predefined image in the descending order is fewer than the number of images present within the range from the certain image to the predefined image in the ascending order, in response to receiving the predefined-image display command; and, a third display switching unit configured to display at least a part of at least one image present within the range from the certain image to the predefined image in the switching order determined by the switching-order determining unit and to display the predefined image at the specific display area on the display screen by switching the image to be displayed at the specific display area on the display screen.

13. The display apparatus according to claim 1, wherein the certain image of the plurality of images is displayed at the specific display area on the display screen and at least two, not including the certain image, of the plurality of images are displayed on the display screen except the specific display area, and wherein a position of the specific display area is a center of display areas at which the plurality of images are respectively displayed.

14. The display apparatus according to claim 1, wherein the processor that, when executing the instructions, causes the display apparatus to function as an image-number obtaining unit configured, when the predefined-image display command is received by the third command receiving unit, to obtain the number of images present within the range from the image being displayed on the display screen to the predefined image in the ascending order and the number of images present within the range from the image being displayed on the display screen to the predefined image in the descending order, wherein the switching-order determining unit is configured, based on the fewer number of images present within the range from the certain image being displayed at the specific area of the display screen to the predefined image in one order than in the other order of the ascending order and the descending order obtained by the image-number obtaining unit, to determine the one order of the ascending order and the descending order as the switching order of the images.

15. The display apparatus according to claim 1, wherein the image display unit is configured to display a command receiving image as the third command receiving unit on the display screen, and wherein the image display unit is configured to concurrently display the command receiving image and the certain image on the display screen and configured not to concurrently display the command receiving image and the predefined image on the display screen.

16. The non-transitory storage medium according to claim 12, wherein the third command receiving unit is configured to allow the reception of the predefined-image display command in a case where the certain image is being displayed at the specific display area on the display screen by the image display unit, and the predefined image is not being displayed at the specific display area of the display screen.

17. The non-transitory storage medium according to claim 12, wherein the display switching unit is configured, when the predefined-image display command is received by the third command receiving unit, to switch the image to be displayed on the display screen by moving the image in the switching order determined by the switching-order determining unit at such a speed that a length of time required from the reception to the display of the predefined image on the display screen becomes a specific length of time.

18. The non-transitory storage medium according to claim 12, wherein the program is designed to cause the computer to function as a display-data creating unit configured, when the predefined-image display command is received by the third command receiving unit, to create display data to display at least one image at the specific display area on the display screen, before the predefined image is displayed, while moving the at least one image by specific moving amounts in the switching order determined by the switching-order determining unit, and
  wherein the display switching unit is configured, when the predefined-image display command is received by the third command receiving unit, to switch the image to be displayed on the display screen by sequentially displaying the at least one image at the specific display area on the display screen based on the display data created by the display-data creating unit.

19. The non-transitory storage medium according to claim 12, wherein the image display unit is configured to display the certain image of a plurality of images at the specific display area and the other images of the plurality of images on the display screen as the image to be displayed on the display screen, such that the certain image of the plurality of images being displayed at the specific display area on the display screen is displayed in a different manner from that of the other images of the plurality of images being displayed on the display screen, and
  wherein the switching-order determining unit is configured, based on the fewer number of images present within the range from the certain image being displayed at the specific display area on the display screen in the different manner to the predefined image in one order than in the other order of the ascending order and the descending order, to determine the one order of the ascending order and the descending order as the switching order of the images in response to receiving the predefined-image display command.

20. The non-transitory storage medium according to claim 12, wherein the certain image of the plurality of images is displayed at the specific display area on the display screen and at least two, not including the certain image, of the plurality of images are displayed on the display screen except the specific display area, and wherein a position of the specific display area is a center of display areas at which the plurality of images are displayed.

21. The non-transitory storage medium according to claim 12, wherein the image display unit is configured to display a command receiving image as the third command receiving unit on the display screen, and
  wherein the image display unit is configured to concurrently display the command receiving image and the certain image on the display screen and configured not to concurrently display the command receiving image and the predefined image on the display screen.

\* \* \* \* \*